March 21, 1961     W. A. STUTSKE ET AL     2,975,554

PRESS MOLD AND METHOD OF OPERATION

Filed March 20, 1957     2 Sheets-Sheet 1

INVENTORS
WILLIAM A. STUTSKE
& JULIUS J. TOROK
BY
W. A. SCHAICH &
LEONARD D. SOUBIER
ATTORNEYS

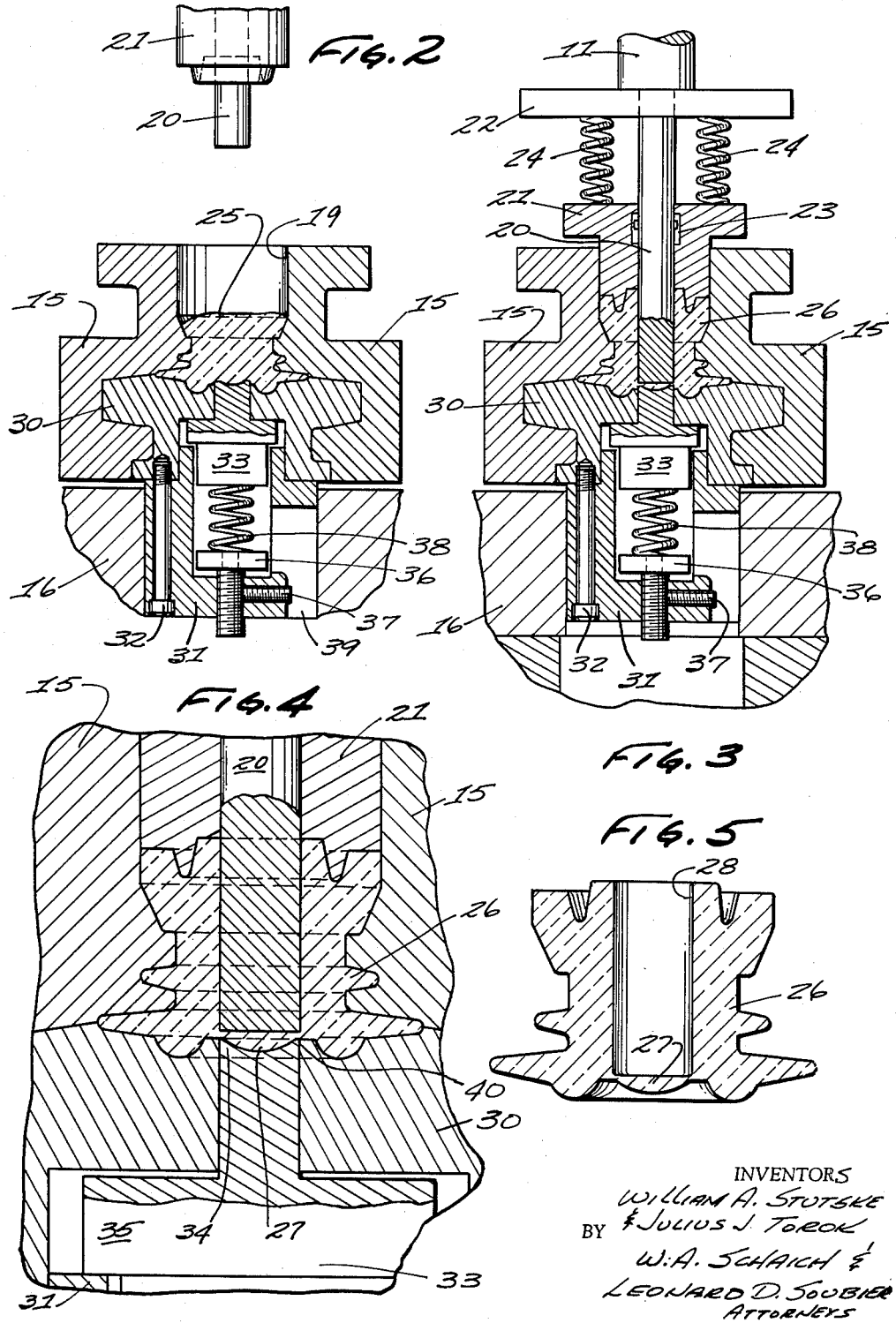

United States Patent Office 2,975,554
Patented Mar. 21, 1961

2,975,554

PRESS MOLD AND METHOD OF OPERATION

William A. Stutske and Julius J. Torok, Toledo, Ohio, assignors to Owens-Illinois Glass Company, a corporation of Ohio Filed Mar. 20, 1957, Ser. No. 647,278

9 Claims. (Cl. 49—72)

This invention relates to press mold machines for molding glass articles and includes means for forming apertures in the articles during the molding operation.

In press molding articles such as certain types of glass insulators, for example, it is frequently required to form a nearly complete aperture through each article as formed. The aperture cannot conveniently be formed extending entirely through the article by a punch-out operation for the removed portion of hot glass tends to foul either the mold or plunger or both. Also the removal of a terminating portion of the aperture must be accomplished without introducing contaminating powdered glass into the mold. Where a plunger is operated to pass entirely through the article to simultaneously form the article with a full aperture, both plunger and mold bottom become badly scored with powdered and fragmented glass, greatly reducing their useful life. After several hundred pieces are so pressed, the mold and plunger surfaces are frequently so severely damaged as to require replacement.

Heretofore, it has been common practice to mold and anneal the article with a window portion located in the lower extremity of its partial opening. Upon cooling of the article the window area is forcefully cracked-out by impact, the opening finished by a grinding operation and then sometimes fire polished. This practice has resulted in a completed article which is unduly weakened at the broken and ground-out window and is decidedly more costly to manufacture. The window break-out and resurfacing does not produce as smooth or as strong an opening as desired, and this particular area of the article has been found to be the primary source of stresses, especially when the article has been subjected to thermal shock or mechanical load after the window has been broken out.

An object of this invention is to provide a novel apparatus for accurately forming nearly full apertures in molded articles. More particularly, this invention provides in combination with a press mold and plunger for molding hollow glass articles, auxiliary means for partially severing a window in axial alignment with the aperture in the molded article concurrently with the movement of portions of the mold and plunger by which the article is molded.

Another object of the invention is to provide means for accurately producing a peripheral cracking of a relatively thin window coaxially disposed with an aperture in a molded article, the press mold and plunger having yieldable portions cooperating to form and produce a partial removal of the aperture window.

Another object of this invention is to provide a method of simultaneously molding a glass article with a window portion and effecting a partial removal of said window during a final stage of the molding operation without contaminating the mold.

The specific nature of this invention, as well as other objects and advantages thereof, will become apparent to those skilled in the art from the following detailed description, taken in conjunction with the annexed sheet of drawings on which, by way of preferred example only, are illustrated the preferred embodiments of this invention.

Referring to the accompanying drawings:

Fig. 2 is a vertical sectional view taken along the line 2—2 showing the mold and plunger with the latter in its lifted position.

Fig. 3 is a view similar to Fig. 2, showing the plunger lowered to near its lower extremity.

Fig. 4 is an enlarged fragmentary sectional view of the plunger and mold bottom lowered to their full cooperative extremity.

Fig. 5 is a vertical sectional view of a molded glass insulator.

Figure 1:
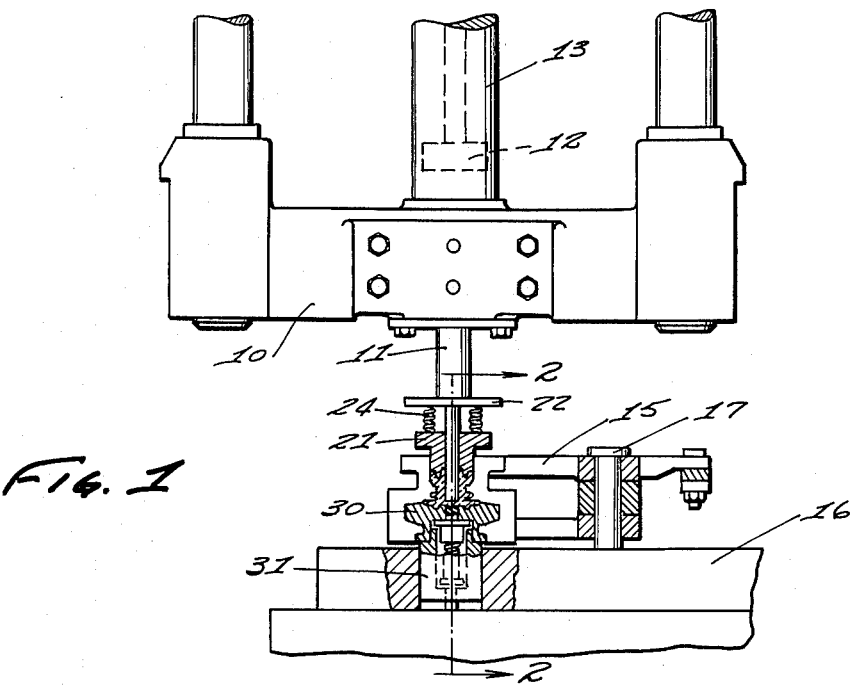
Fig. 1 is a part-sectional elevational view of a press molding machine embodying the principles of our invention.

Referring particularly to Fig. 1, the invention is shown as applied to and forming a part of a press molding machine which, except as to the particular mechanism for forming the apertures in the molded articles, is in the main, of conventional construction. The machine comprises a press plunger head 10 and plunger rod 11 lifted and lowered by a piston motor comprising a piston 12 which reciprocates within a cylinder 13 mounted on the machine frame (not shown).

A sectional mold 15 comprised of mold halves or sections is mounted on a mold bottom plate 16 and pivoted to swing about a pivot pin 17. The mold sections are locked together for the molding operation by a locking device (not shown). A press plunger is connected to the plunger rod 11 for vertical reciprocating movement into and out of the mold cavity 19 as shown on Figs. 2 and 3. A plunger stem or extension 20 is attached to a head plate 22 mounted on the lower end of rod 11.

A pressure ring 21 which surrounds the plunger 20 is attached thereto by a keyway 23 and is slidable up and down thereon, the upward and downward movement being limited by the vertical length of the keyway. Coil compression springs 24 surrounding said plunger 20 are held under compression by the head plate 22 and the plunger ring 21.

The parts as thus far described are essentially of conventional construction. The mechanism for forming apertures in the molded articles in accordance with the present invention will now be described.

As shown on Figs. 2 and 3, an anvil 30 having a stationary mounting on the base plate 16 is secured in position over an opening therein. An anvil supporting member 31 is firmly mounted in said opening and is secured in position affixed to said anvil 30 by one or more stud bolts 32. Anvil 30 is adaptable to being surrounded by the sectional mold halves 15 on closing the mold and constitutes the major bottom surface of the mold. Anvil 30 and its supporting member 31 have a coextensive central opening extending vertically therethrough in which is mounted a movable anvil center member 33. The anvil center 33 has an upper surface 34 (Fig. 4) which is contoured concavely in its central portion with upper edges coextensive with the molding surface of anvil 30. Anvil center 33 also has a shoulder portion 35 which is adaptable to reciprocal movement between the underside of anvil 30 and anvil supporting member 31.

Anvil support 31 has a vertically adjustable threaded plug 36 located in an axial opening in its bottom which is secured in position by a set screw 37. Anvil support 31 has at least several radial openings 39 which facilitate ventilation of its central interior chamber. Anvil center 33 is vertically retained axially within anvil 30 and immediately above anvil support 31 by a coil suspension spring 38 held in compression between the anvil center 33 and the bottom plug 36. The anvil 30 is formed with a circular shearing edge 40 which cooperates with the yieldable anvil center 33 as hereinafter described for partially shearing the glass to form a nearly complete opening through the molded article.

The plunger extension 20 is formed with a flat surface at its lower end comprising a right-angled cylinder as shown on Fig. 4. The anvil center 33 is formed with a concave surface 34 surrounded by a flat annular surface adaptable to cooperate with the flat end surface of the plunger 20 to form a plano-convex window portion in the molded article. Plunger 20 and yieldable anvil center 33 are preferably of equal diameters so that when plunger 20 is finally lowered a slight vertical shearing of the molded article is effected within the mold.

The operation is as follows:

When the press head 10 is in its lifted position (Fig. 2), a charge or gob 25 of molten glass is placed within the mold cavity 19. The head 10 is then lowered so that the plunger 20 and pressure ring 21 enter the mold and enclose the cavity 19 (Fig. 3). The upper portions of mold halves 15 have vertical interior surfaces in which the plunger ring 21 is movable. As the plunger moves downwardly and approaches the anvil 30, the glass directly over the anvil and between it and the plunger is forced to spread out laterally forming the contour of the article such as the plurality of comparatively thin annular flanges of the illustrated insulator 26. The resistance offered to the spreading of the glass results in an increased pressure on the upper surface of the anvil and the bottom surface of the plunger directly thereover. The area of the plunger extension 20 is coextensive laterally with the area of the aperture which is formed in the molded article during the downward movement of the two-part plunger.

As the plunger head is continued further downwardly, the compressive force applied to the yieldable plunger ring 21 is increased to the point where its compression springs 24 are compressed permitting the ring 21 to stop and then conversely be moved upwardly as the compressive loading is further increased. During this period the rigid main portion of the plunger, namely, the cylindrical extension rod 20, is moved further downwardly into closer proximity with the mold bottom.

The anvil center 33 during the aforegoing initial stages of molding is in an upward position as shown on Fig. 3 with its shoulder annularly contacting the underside of anvil 30 with its upper molding surface 34 either in contiguous alignment with the adjoining and surrounding molding surface of anvil 30 or slightly above the same. When the bottom face of plunger extension 20 reaches a distance of approximately 1/16" from the anvil center 33, the glass therebetween is cooled to an extent whereby a permanent set is established in the glass due to the thinness of the flat annular band surrounding the planoconvex window formed in the center of the article. At this point, and when the compressive loading on plunger ring 21 has reached a predetermined level, anvil center 33 is moved downwardly a short distance by increased compressive loading of the plunger extension 20 on the glass window 27 which both then move through a prescribed distance of approximately .01 to .05 inch. Thus, the yieldable portion of the mold bottom requires a higher compressive loading for its downward movement than the plunger ring requires for its upward movement. The conjunctive downward movement of the rigid plunger extension 20 and anvil center 33 a short distance produces one or more peripheral cracks extending around the window perimeter.

The shoulder portion of the plunger which is initially yieldable upwardly allows for deviations in the amount of glass charge in an area of the molded article where dimensions are not critical. Also, as a modification of the subject molding, any other portion of the mold sidewalls or bottom may be constructed to be initially yieldable prior to final movement of the window 27 against a secondarily yieldable portion of the mold bottom.

The specified distance of yield of the anvil center is sufficient to cause the thin perimeter of window 27 left in the bottom of the opening to at least partially crack around its edges in a peripheral pattern. The necessary compressive force to accomplish this is attained when the glass remaining between the mold plunger and the yieldable anvil center freezes to a much higher viscosity than that of the mass of the article.

The insulator 26 is removed from the mold while still hot and the window break-out is performed while the article is at elevated temperatures prior to its being annealed or heat-treated. Fire polishing of the remaining annular edges may be performed as a subsequent operation with a minimum of time and effort because the glass is hot.

Figure 7:
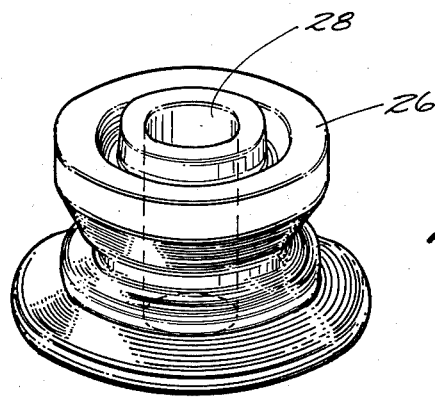
Figs. 6 and 7 are perspective views of the insulator.
Figure 6:
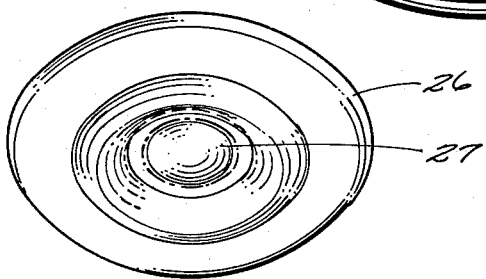

With this peripheral cracking existent in the insulator 26 as initially fabricated (Figs. 5 and 6), the window portion 27 may be readily removed with a relatively smooth break immediately after the insulator 26 is removed from the mold to make the axial opening 28 fully extensive through the insulator. It is preferable to allow the insulator 26 to cool for a period of about 5 to 20 seconds after its removal from the mold to permit the glass in the window area to set into a more rigid condition for improved breakout. The window 27 may then be easily knocked out with a rod for example without any undue force being required or excessive chipping of the glass being produced. Thus rapid completion of the insulator is possible prior to a heat-treating operation if desired. The bottom of the insulator is shown in perspective on Fig. 6 illustrating the central window 27 which is removed with slight impact and the completed insulator is shown on Fig. 7.

Insulators fabricated in accordance with the above teaching have indicated a thermal shock strength which is much higher than those heretofore made according to known methods. Their central openings are smooth and not a source of stress imbalance after heat treatment. The mold and plunger are not subjected to glass remaining behind each piece as pressed, since the unwanted window is completely removed from the mold as a part of the article for later elimination exteriorly of the mold. The peripheral crack induced in the desired area greatly facilitates the window removal from the hot, newly-formed article. It has been found that after the window is broken out its remaining edges may be quickly fire-polished and the insulator annealed. Thus reheating of the article prior to fire polishing is unnecessary due to the residual heat of molding which is utilized for same.

Obviously the molded insulator is set forth as an example only. The molded article may assume other and widely varied shapes of dissimilar products which may have apertures fabricated in accordance with the aforementioned teaching.

Various additional modifications may be resorted to within the spirit and scope of the appended claims.

We claim:

1. Apparatus for press molding glass articles having a recess and a thin frangible window formed within said recess comprising, in combination, an open-ended mold having a mold cavity providing inner wall and bottom surfaces, a press plunger mounted in alignment with the open end of said mold, means for moving said press plunger in reciprocating movement into and out of said mold cavity, a movable window molding and severing element disposed within a bottom region of said mold having an upper surface essentially coextensive with the said mold bottom surface, resilient means supporting said movable window molding and severing element within the bottom region of said mold, said press plunger having a rigid projecting portion and a movable annular shoulder portion mounted therearound adapted to close the said mold cavity, resilient means on said moving means supporting the said movable shoulder portion of said plunger, the said rigid projecting portion of said press plunger being oppositely disposed and adapted to movement into proximity with said window molding and severing element by said plunger moving means, the said resilient means supporting the movable annular shoulder portion of said plunger being more readily yieldable than the said resilient means supporting the said movable window molding and severing element.

2. The combined apparatus in accordance with claim 1, wherein the said rigid projecting portion of said press plunger and the said movable window molding and severing element disposed in the said mold bottom have essentially similar cross-sectional shape adapted to form a thin frangible window within said article recess during press molding.

3. The combined apparatus in accordance with claim 1, the opposing molding surfaces of said rigid projecting portion of said plunger and the movable window molding and severing element disposed in the said mold bottom are peripherally parallel adapted to effect partial peripheral severance of the article window portion within the mold during their conjunctive downward movement.

4. The combined apparatus in accordance with claim 1, including an integral annular flange on a lower region of said movable window molding and severing element disposed in the said mold bottom, and a stop surface for said annular flange disposed in a lower region of said mold adapted to limit downward movement of said window molding element against its resilient supporting means.

5. Apparatus for press molding glass articles having a body portion with a recess and a thin frangible window formed adjacent said recess, comprising, in combination, an open-ended mold having a mold cavity providing inner wall and bottom surfaces, a pressure ring having a central opening therethrough movably mounted on said mold with said central opening in alignment with said mold cavity, a press plunger mounted in alignment with the open end of said mold and said central opening, said press plunger having a rigid projecting portion adapted to close the mold cavity, means for moving said press plunger in reciprocating movement into and out of said pressure ring central opening and said mold cavity with the said projecting portion when fully introduced disposed in proximity to the said mold bottom, first resilient means located between and engaging said pressure ring and said plunger to provide resilient movement of said pressure ring relative to said mold upon movement of said plunger, a movable bottom plug disposed within a lower region of the mold having an upper surface essentially coextensive with the mold bottom surface and in alignment with said plunger projecting portion, second resilient means supporting said movable bottom plug within said lower mold region, said first resilient means being more readily yieldable than said second resilient means supporting the said movable bottom plug, said projecting portion adapted to successively form and then partially sever said window of the said article within the mold during the molding operation.

6. The combined apparatus defined in claim 5, wherein the resilient means for supporting the annular shoulder portion of said plunger and the resilient means for supporting said movable bottom plug are comprised of compression springs, the former being more readily yieldable than the latter under compressive loading.

7. The method of press molding glass articles having a body portion with a deep recess and a thin readily frangible window therein, comprising the steps of introducing a charge of molten glass into an open-ended mold having a mold cavity defined by closed side and bottom walls, pressing said molten glass within said mold to fill the mold cavity by a press plunger having a projecting central portion, applying compressive force to the molten glass by said plunger until its projecting central portion closely approaches the mold bottom wall and forms an essentially solidified thin window portion therebetween, applying increased compressive loading to said essentially solidified window portion only and displacing said window portion a limited distance relative to the article body portion to effect at least a partial peripheral severance of the said window portion from the article body portion by said limited movement, and removing the molded article from said mold with the readily frangible window portion attached.

8. The method defined in claim 7 including the step of forming said window portion contiguous with the bottom surfaces of the article at a terminating region of said recess.

9. The method of press molding glass articles having a body portion with a deep recess and a thin frangible window therein, comprising the steps of introducing a charge of molten glass into an open-ended mold having a mold cavity defined by closed side and bottom walls, pressing said molten glass within said mold to fill the mold cavity by a press plunger having a projecting rigid central portion, applying compressive force to the molten glass by said plunger until its rigid projecting portion approaches the mold bottom wall and forms an essentially solidified thin window portion therebetween, axially moving the said window portion a limited distance relative to the article body portion to produce at least a partial peripheral severance of the said window portion from the article body portion by said limited movement and removing the molded article from said mold with the readily frangible portion attached.

References Cited in the file of this patent

UNITED STATES PATENTS

| | | |
|---|---|---|
| 301,427 | Beck | July 1, 1884 |
| 314,969 | Mendenhall | Mar. 31, 1885 |
| 851,904 | Steimer | Apr. 30, 1907 |
| 852,129 | MacBeth | Apr. 30, 1907 |
| 1,125,760 | Steimer | Jan. 19, 1915 |
| 2,087,470 | Davidson et al. | July 20, 1937 |
| 2,393,549 | McCreery | Jan. 22, 1946 |
| 2,419,763 | Cassell | Apr. 29, 1947 |
| 2,573,365 | Scholes et al. | Oct. 30, 1951 |

FOREIGN PATENTS

| | | |
|---|---|---|
| 501,865 | Great Britain | Mar. 7, 1939 |
| 648,816 | Great Britain | Jan. 10, 1951 |